(12) United States Patent
Fu et al.

(10) Patent No.: US 8,253,985 B2
(45) Date of Patent: Aug. 28, 2012

(54) IMAGE REGISTRATION PARAMETERS AND CONFIDENCE ESTIMATION FROM SENSOR DATA

(75) Inventors: Guoyi Fu, Vaughan (CA); Mikhail Brusnitsyn, North York (CA)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/015,278

(22) Filed: Jan. 27, 2011

(65) Prior Publication Data
US 2012/0194873 A1 Aug. 2, 2012

(51) Int. Cl.
*H04N 1/40* (2006.01)
(52) U.S. Cl. ........ 358/448; 358/447; 358/474; 358/518; 382/247; 382/294; 382/173; 382/141
(58) Field of Classification Search .................. 358/447, 358/448, 474, 518; 382/247, 294, 173, 141
See application file for complete search history.

(56) References Cited

U.S. PATENT DOCUMENTS

| | | | |
|---|---|---|---|
| 6,621,599 B1 * | 9/2003 | Newell | 358/474 |
| 7,477,783 B2 * | 1/2009 | Nakayama | 382/173 |
| 7,693,348 B2 * | 4/2010 | Zavadsky et al. | 382/294 |
| 7,773,796 B2 * | 8/2010 | Bledsoe et al. | 382/141 |
| 7,813,592 B2 | 10/2010 | Vetter et al. | |
| 2009/0161169 A1 * | 6/2009 | Muramatsu | 358/447 |
| 2009/0168128 A1 * | 7/2009 | Matsuzaki | 358/518 |
| 2010/0054627 A1 | 3/2010 | Rosenberg | |
| 2010/0073732 A1 * | 3/2010 | Matsunaga | 358/447 |
| 2010/0123907 A1 | 5/2010 | Edgar et al. | |
| 2010/0124384 A1 | 5/2010 | Edgar et al. | |
| 2010/0165422 A1 | 7/2010 | Mohan Reddy et al. | |
| 2010/0171996 A1 | 7/2010 | Kien et al. | |
| 2011/0149123 A1 * | 6/2011 | Matsuoka | 348/247 |

* cited by examiner

*Primary Examiner* — Twyler Haskins
*Assistant Examiner* — Michael Burleson
(74) *Attorney, Agent, or Firm* — Mark P. Watson

(57) ABSTRACT

An off page condition or invalid sensors position data is detected by checking the errors from an initial transformation parameter estimation. If an abnormally large error is encountered, a sensor's reading (position data) may be invalid or the sensor was off page. Then the invalid sensor data will be identified and removed. Finally the transformation parameters will be re-estimated using valid sensor position data only. A weighted least-square minimization is used by considering the sensor lift situation. If a sensor is lifted, the weight for the error related to the sensor will be set to a small weight or zero. Also considered are the geometric properties of sensor locations in weighting the sensor error. A confidence measurement of the sensor data and associated error is performed. The confidence measurement is derived from an error ellipse at 95% confidence level.

24 Claims, 12 Drawing Sheets

Frame 16　　　　　　　　　Frame 17

Overlap Area

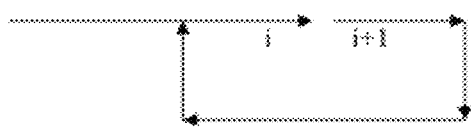
FIG. 11   FIG. 12
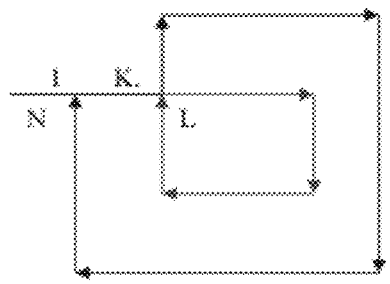
FIG. 13

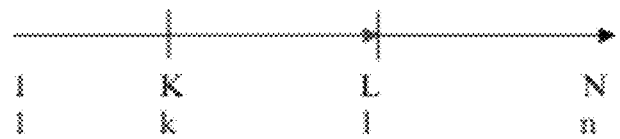
FIG. 14
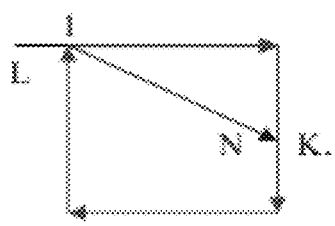
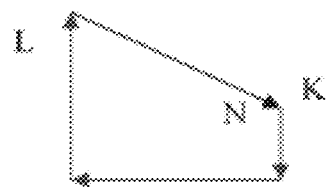
FIG. 15
FIG. 16

IMAGE REGISTRATION PARAMETERS AND CONFIDENCE ESTIMATION FROM SENSOR DATA

CROSS-REFERENCE TO RELATED APPLICATIONS

Commonly owned U.S. patent application Ser. No. 12/648,236, filed Dec. 28, 2009, Publication No. 2010/0171996, and U.S. patent application Ser. No. 12/645,421, filed Dec. 22, 2009, Publication No. 2010/0165422 are hereby incorporated by reference in their entirety. This application is also related to commonly owned U.S. patent application Ser. No. 13/015,285, filed Jan. 27, 2011, entitled "System and method for real-time image retensioning and loop error correction" and U.S. patent application Ser. No. 13/015,355, filed Jan. 27, 2011, entitled "System and method for integrating pair-wise registration of images using image based information and sensor coordinate and error information", the contents of such applications being hereby incorporated by reference in their entirety.

BACKGROUND

1. Field of Invention

The present invention is related to scanning devices, particularly document scanners of the hand-held type, such as a mouse scanner.

2. Description of Related Art

A variety of document scanning devices exist in the art. They include fax machines, copiers, multifunction fax/copy/print devices, stand-alone flat-bed scanners and the like. A disadvantage to these types of devices is that they are large and not portable. So, the document to be scanned must be brought to them. Recently, small hand-held scanners have been introduced. Some are portable and stand-alone such as the VuPoint PDS-ST410-VP Magic Wand Portable Scanner. Others can be connected to a laptop computer such as the Xerox Travel Scanner 100. These types of scanners, however, are still large enough to accept a sheet of paper.

A more recent development is a very small scanner that scans only a portion of the document (e.g. a page of a book or a photo) as the scanning device is moved over the document. Image processing is used to stitch together these scanned portions to create a copy of the entire page or entire photo. U.S. published patent application no. US 2010/0124384 describes one example of this type of device. In some cases the devices operate in two modes; in one mode they operate as a conventional mouse and in another mode they operate as a scanner. Commonly owned U.S. patent application Ser. No. 12/648,236, filed Dec. 28, 2009, Publication No. 2010/0171996, and U.S. patent application Ser. No. 12/645,421, filed Dec. 22, 2009, Publication No. 2010/0165422, describe this type of device, sometimes referred to as a "mouse scanner."

Some of the problems encountered in these types of small scanners that are moved by hand over a document are poor image quality and poor registration of the multiple scanned portions.

SUMMARY OF INVENTION

In the present invention, we first estimate transformation parameters that are used to map pixels from one frame to another. Laser motion sensors, preferably four geometrically distributed (in a rectangle or square), are located on the bottom of the mouse scanner to identify the position of the mouse scanner as it is moved across a page. As the mouse scanner is moved, it captures images at a predetermined frequency. As each image is captured the laser motion sensors provide position data. Each sensor therefore provides a position pair for two consecutive frames. These position pairs can then be used to relate the position of one captured frame to another. Transformation parameters are estimated by these position pairs. In a perfect environment, the change in position from one frame to another should be a rigid object motion for all position pairs. However, in a real-world environment, the sensors will not report exact position data. So, we calculate a registration error to determine if one or more of the sensors is reporting invalid position data.

Off page is one of main reasons that the mouse scanner may produce invalid sensor data. When laser sensor is physically off the page being scanned (e.g. due to a bent page or the mouse scanner moving near a book spine), the sensor stops recording movements. This affects the registration accuracy, especially when the sensors do not correctly report their "lift" bit. Each sensor includes a lift bit that should be set and reported when the sensor detects that it is too far from the page to record the mouse scanner position.

In the present invention, we detect the off page condition or invalid sensor position data by checking the errors from an initial transformation parameter estimation. If an abnormally large error is encountered, we conclude that a sensor's reading (position data) may be invalid or the sensor was off page. Then the invalid sensor data will be identified and removed. Finally the transformation parameters will be re-estimated using valid sensor position data only. As a result, the accuracy of transformation parameters is improved, which give a much better initial registration that can be further refined.

In addition, we use weighted least-square minimization by considering the sensor lift situation. If a sensor is lifted, the weight for the error related to the sensor will be set to a small weight or zero. We also considered the geometric properties of sensor locations in weighting the sensor error. If the 4 sensors are not formed in a square, the errors from horizontal and vertical pairs are weighted differently so that it improves the accuracy.

In addition, we perform a confidence measurement of the sensor data and associated error. The confidence measurement is derived from an error ellipse at 95% confidence level, which means that there is 95% probability that the true parameters will remain within the area specified by the ellipse. As expected, as more sensors are used to compute the error ellipse, the area of the ellipse becomes smaller. If the estimated values lie closer to the true parameter, this will also reduce the ellipse area.

The error ellipse at 95% confidence level may be used as a dynamic search area for registration. The confidence measurement is also used in the weight function for integrating image information and sensor data for pair-wise registration.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 11 illustrates a registration loop in which there is a registration break between a frame and the previous frame.

FIG. 12 illustrates a close-the-loop correction of the break shown in FIG. 11 by registering the frame to an earlier frame that is before the previous frame.

FIG. 13 illustrates a case in which a new loop contains one or more closed loops.

FIG. 14 illustrates extraction of the new loop shown in FIG. 13 from frames 1 to N.

FIG. 15 illustrates a case in which a new loop is inside a closed loop, which has been corrected.

FIG. 16 illustrates the extraction of frames from K to N for the new loop shown in FIG. 15, where frames K to L are corrected.

DESCRIPTION OF THE PREFERRED EMBODIMENTS

Figure 1:
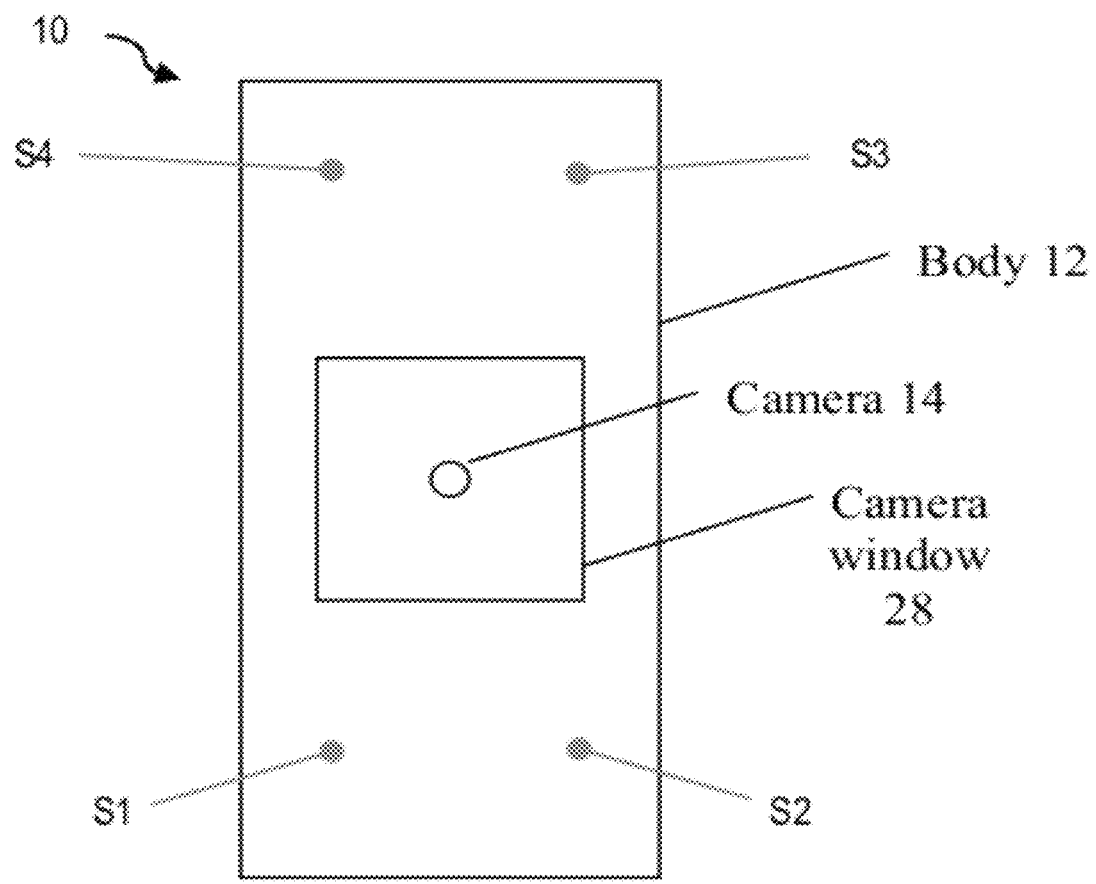
FIG. 1 is a schematic view of the mouse scanner 10 of the present invention.
Figure 2:
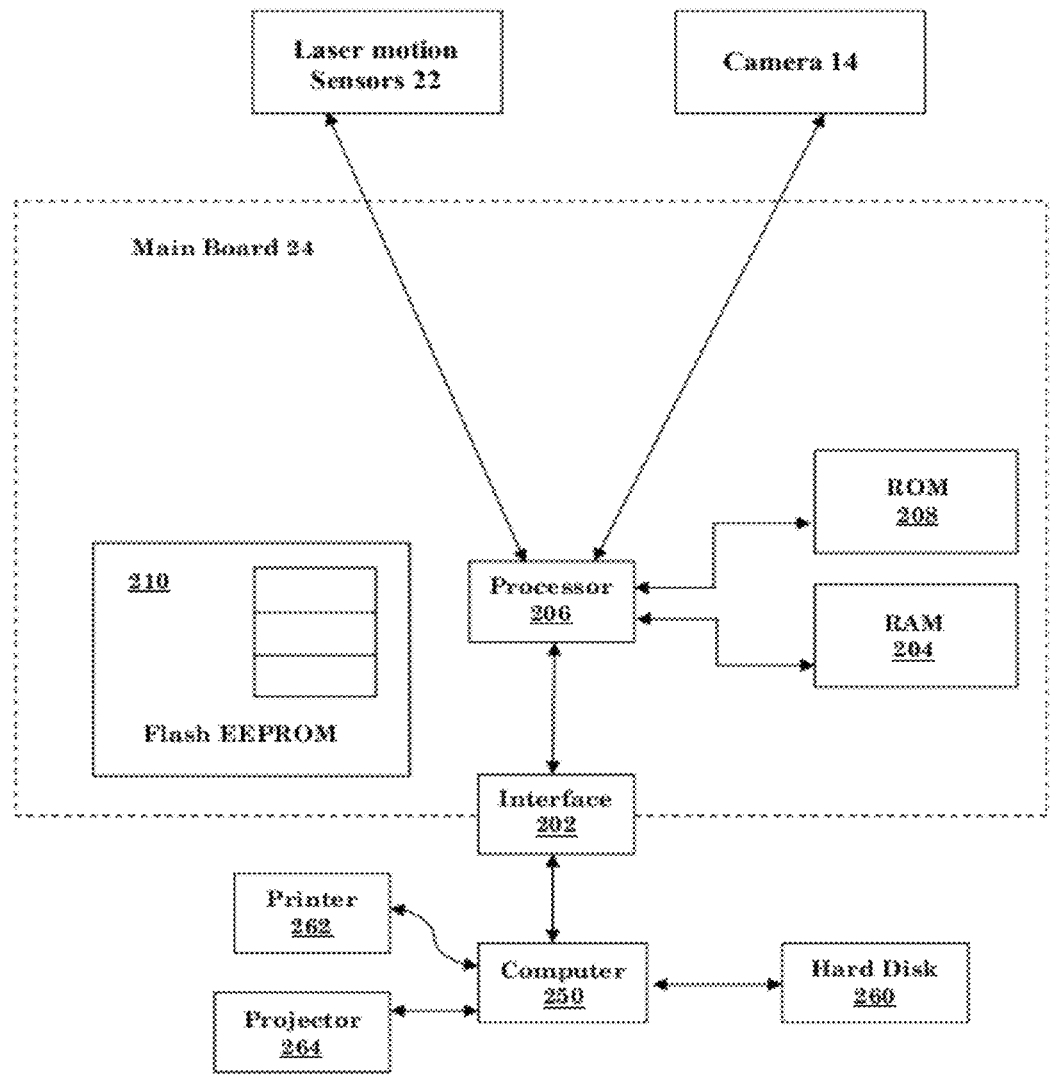
FIG. 2 is a system block diagram of the present invention.

FIGS. 1 and 2 are schematic views of the mouse scanner 10 and system of the present invention. The housing 12 is preferably shaped like a typical computer mouse. Inside the housing 12 is a camera 14. Preferably camera 14 is a CMOS sensor type that is especially suited for digital imaging. However, other types of devices for digitizing a scanned area, such as CCD (charge coupled device) type image capturing device, can be used. The image capture portion of mouse scanner 10 may also include LEDs positioned to illuminate the portion of a document that is underneath mouse scanner 10 as it is moved over the document. LEDs are the preferable light source but other types such as incandescent or fluorescent could be considered possible alternatives depending on the size and configuration of mouse scanner 10. To enhance or improve illumination, light reflecting mirrors may also be provided. The image is captured through scanning window 28 formed in the bottom of the mouse scanner housing 12.

Although the present invention is described herein with reference to a particular device, i.e. a mouse scanner, for ease of understanding, it is to be understood that aspects of the present invention apply to other devices that acquire input data such as digital cameras, video cameras, scanners, and other sensing devices such as X-ray machines or MRI machines. Also, the term "image" similarly applies to the input data acquired by such devices.

Once a scan button is pressed by an operator, the mouse scanner 10 is moved across the document, with the position of mouse scanner 10 indicated by four laser motion sensors 22. A scan button is just one option to control the scanning process, which could also be automatically controlled. These laser motion sensors 22 are located on the bottom of mouse scanner 10 and shown as sensors S1, S2, S3, and S4 in FIG. 1. These laser motion sensors 22 provide position indicating data that represent the relative position of one captured image (a frame) to another. Each captured frame can also be thought of as a "tile." The frames or tiles are stitched together based, at least initially, upon their relative positions as indicated by the laser motion sensors 22. A composite image is formed (refined) using image processing, which, for example measures the correspondence between adjacent stitched images that form the composite. Laser motion sensors are preferably used for position sensing but alternative position sensors could include speed, acceleration, and/or gyroscopic sensors.

Mouse scanner 10 also includes an FPC (flexible printed circuit) main board 24. Main board 24 controls the activity and processing in mouse scanner 10 and communicates with an external PC via, for example, a USB connector port. FIG. 2 is a schematic representation of main board 24 and its connection to an external PC (host computer). Main board 24 exchanges data with a host computer 250 (PC) by way of an intervening interface 202. Application programs and an image capture device driver may also be stored for access on the host computer 250. The driver can receive and interpret various signals and data from main board 24, and provide necessary information to the user by way of the host computer 250.

When data is sent by the host computer 250, the interface 202 receives the data and stores it in a receive buffer forming part of a RAM 204. The RAM 204 can be divided into a number of sections, for example through addressing, and allocated as different buffers, such as a receive buffer or a send buffer. Data, such as digital image data, can also be obtained by camera 14, the flash EEPROM 210, or the ROM 208. For example, the camera 14 can generate a digital image by scanning a portion of a document, such as a page of a book or a photo. This digital image can then be stored in the receive buffer or the send buffer of the RAM 204.

A processor 206 uses computer-executable instructions stored on a ROM 208 or on a flash EEPROM 210, for example, to perform a certain function or group of functions, such as the methods of the present invention. Where the data in the receive buffer of the RAM 204 is a digital image, for example, the processor 206 (or more likely one or more processors in computer 250) can implement the methodological acts of the present invention on the digital image to, for example, stitch the digital image with other digital images based upon their position information and feature correspondence to create a composite image representing a whole page or photo. Further processing in an imaging pipeline may then be performed on the digital image before the image is transferred to the host computer 250 for additional processing, for printing on printer 262, projected with projector 264, or stored on hard disk 260, for example.

The methods of the present invention and variations thereof disclosed herein can be implemented using tangible, non-transitory computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store program code in the form of computer-executable instructions or data structures and that can be accessed by a processor of a general purpose or special purpose computer. Combinations of the above should also be included within the scope of computer-readable media.

Computer-executable instructions comprise, for example, instructions and data that cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

As discussed above mouse scanner 10 includes four laser motion sensors 22 and a CMOS sensor type camera 14 to capture the image underneath the mouse scanner housing 12. When scanner button is pressed by an operator (or if an automatic scanning process is initiated) an image acquisition function performed by main board 24 (e.g. by the processor 206 performing instructions stored on a ROM 208 or on a flash EEPROM 210) returns raw image data from camera 14 and sensor coordinates and state from laser motion sensors 22. Laser motion sensor state includes a lift bit. The lift bit indicates that the sensor is lifted from the surface, i.e. too far from the surface of the document being scanned to provide accurate position information. This can happen when the document surface is uneven, such as folded or bent pages or near the spine of a book. If the lift bit is set, the position data from that sensor may not accurately represent the movement of the mouse scanner and may be invalid and not used in the present invention for registration of the associated frame or tile.

The resolution of camera 14 is 300 dpi, for example. Images are acquired 10 times per second, for example, as mouse scanner 10 is moved across and down the page by an operator. Typically the movement of the mouse scanner 10 by the operator is across one row, down one column, back across the next row, and so on. To avoid dropped frames during peak processing load, image acquisition may be run in a separate thread, or possibly of higher priority in some embodiments. The size of the FIFO for sending images to the main thread should not exceed 5 as delays higher than 0.5 sec are unacceptable.

The image acquisition procedure drops frames if the mouse does not move in an embodiment. This saves CPU time on image processing and reduces load on loop correction. However, frames with all four lift bits set should not be dropped and should be processed so that the application can stop the image acquisition procedure when the mouse scanner 10 has been completely lifted off the page by the operator (thus indicating scanning should be stopped).

Figure 3:
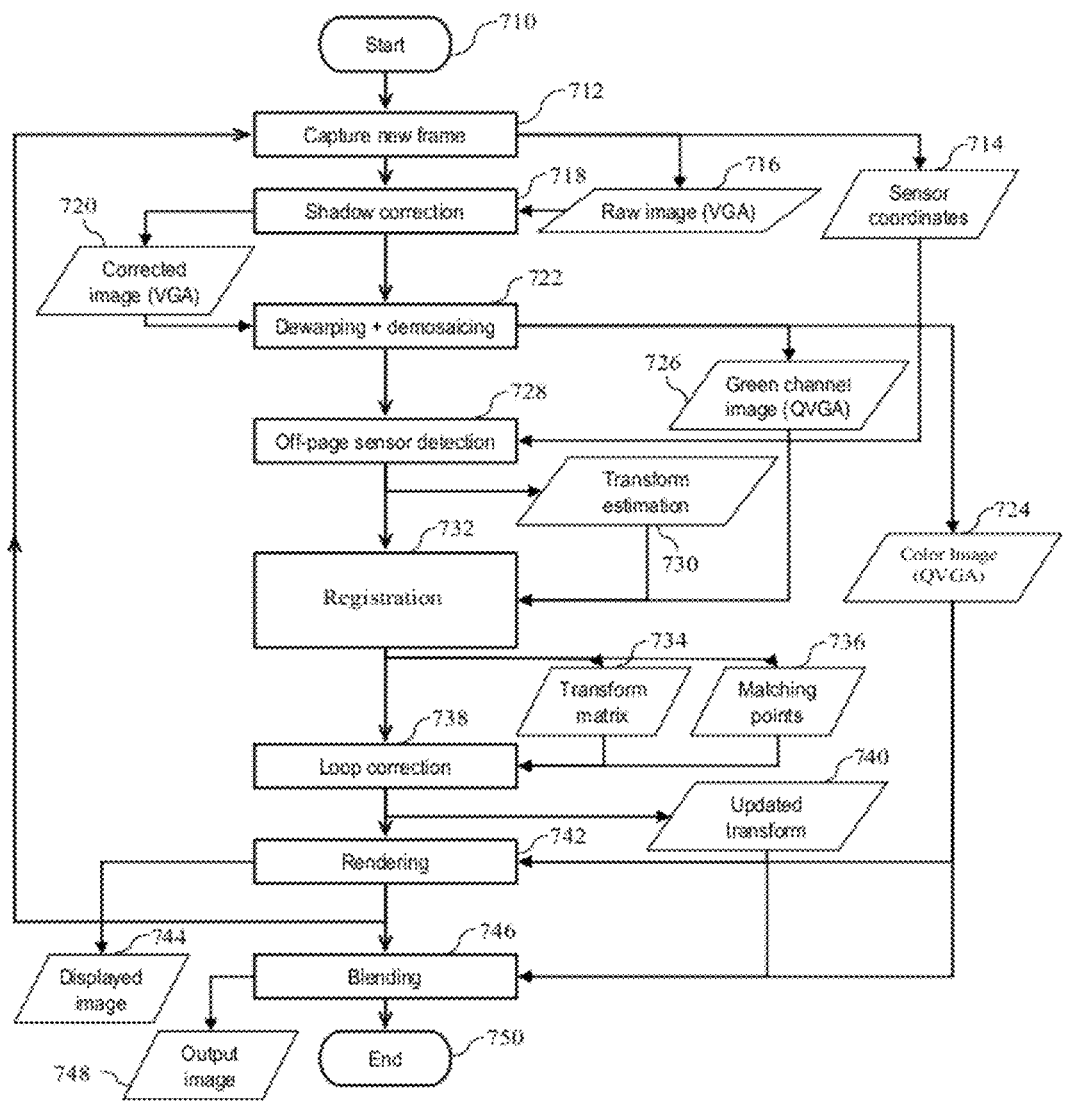
FIG. 3 is a flow diagram of the overall process of the present invention.

FIG. 3 is a general flow diagram of the image acquisition procedure of the present invention. The procedure starts at step 710 when mouse scanner 10 is placed on the document to be scanned. Scanning begins when an operator presses a scan button and a new frame is captured by camera 14 in step 712. At the same time the new frame is captured the position of that frame is indicated by position data input from laser motion sensors 22 at step 714. The raw image (VGA) for that frame is stored (step 716) in computer 250, for example, correlated with its position data input from laser motion sensors 22.

In mouse scanner 10 non-uniform lighting and an inexpensive lens in camera 14 can cause a noticeable shadow in the raw image. In an embodiment of the present invention, shadow correction (step 718) is applied to the raw image (VGA) to produce a corrected image (VGA) that is stored in computer 250 (step 720) in place of the raw image.

Dewarping and demosaicing of the corrected image frame is next performed in step 722. Lookup table based dewarping is used. The lookup table is stored in a calibration file.

Figure 4:
FIG. 4 illustrates a pixel quad in a Bayer mosaic.

Good demosaicing algorithms are computationally expensive. Processing time seems to have a higher priority than image quality, so special alignment of pixels of different color is determined to be enough. One pixel has to be generated in the output color image for each quad shown in FIG. 4, which is a pixel quad in Bayer mosaic. This results in a quarter (QVGA) of the maximum resolution of the original VGA image (step 724). The green pixel value can be obtained by averaging 2 green pixels in the raw image (step 726). To account for the offset between color channels, the dewarping lookup table coordinates are changed by $(-\frac{1}{4}, +\frac{1}{4})$ and $(+\frac{1}{4}, -\frac{1}{4})$ for red and blue pixels correspondingly.

Bilinear interpolation should be enough to obtain dewarped color image.

On the other hand, the quality of images used for registration is important. It is possible to take green channel pixels of the raw image (effectively 320×480) and interpolate missing pixels to obtain a VGA size image. Bicubic interpolation is preferred in dewarping. Therefore, interpolation is performed two times in this scenario.

Figure 5:
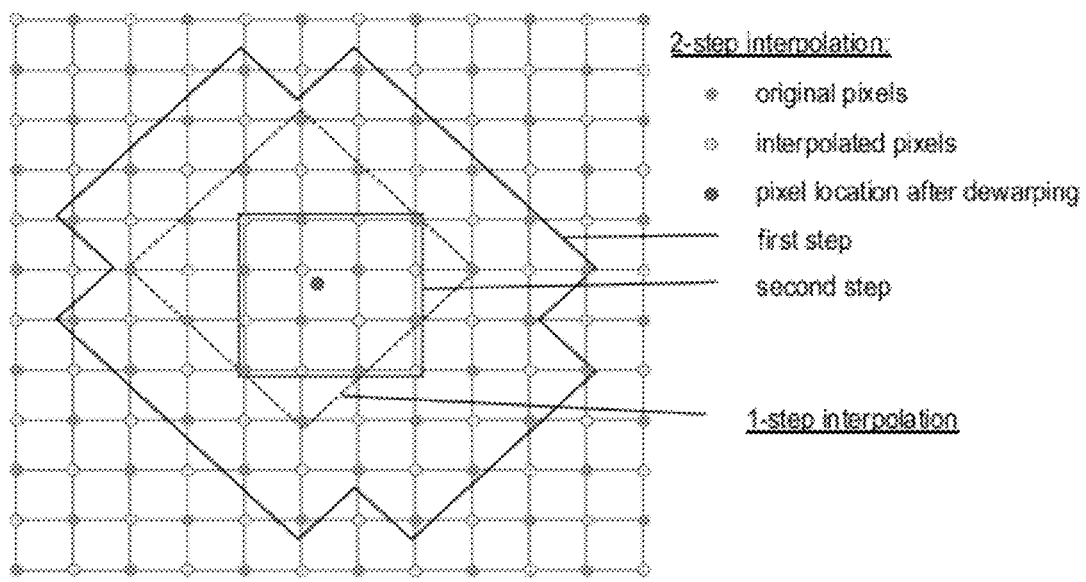
FIG. 5 illustrates interpolation options for dewarping in the present invention.

Alternatively, we can apply bicubic interpolation to original green pixels of the raw image. In this case scan lines appear to be rotated by 45°. FIG. 5 illustrates options in dewarping.

A preferred embodiment uses a QVGA size green channel image (from step 726) for registration. Pixels of that image are obtained by averaging the two green pixels of each quad. In the present invention, as each step in the image processing is performed, the resultant image is stored in computer 250 for further processing, registration or rendering. Each resultant image frame is stored with its corresponding position data.

As mentioned previously laser motion sensor 22 position data includes lift bits that are set by mouse scanner 10 firmware in EEPROM 210, for example, when a laser motion sensor 22 is lifted off the document that is being scanned. Since lifted sensors do not generate a valid position coordinate, they are detected in step 728 and then ignored in one stage of the transform estimation (step 730).

As part of or a prelude to registration, the relative transform between adjacent frames is estimated based on the sensor coordinates that are valid for both images.

Transform estimation (step 730 in FIG. 3) is described in detail in the following section.

Transform Estimation (Step 730)

Figure 6:
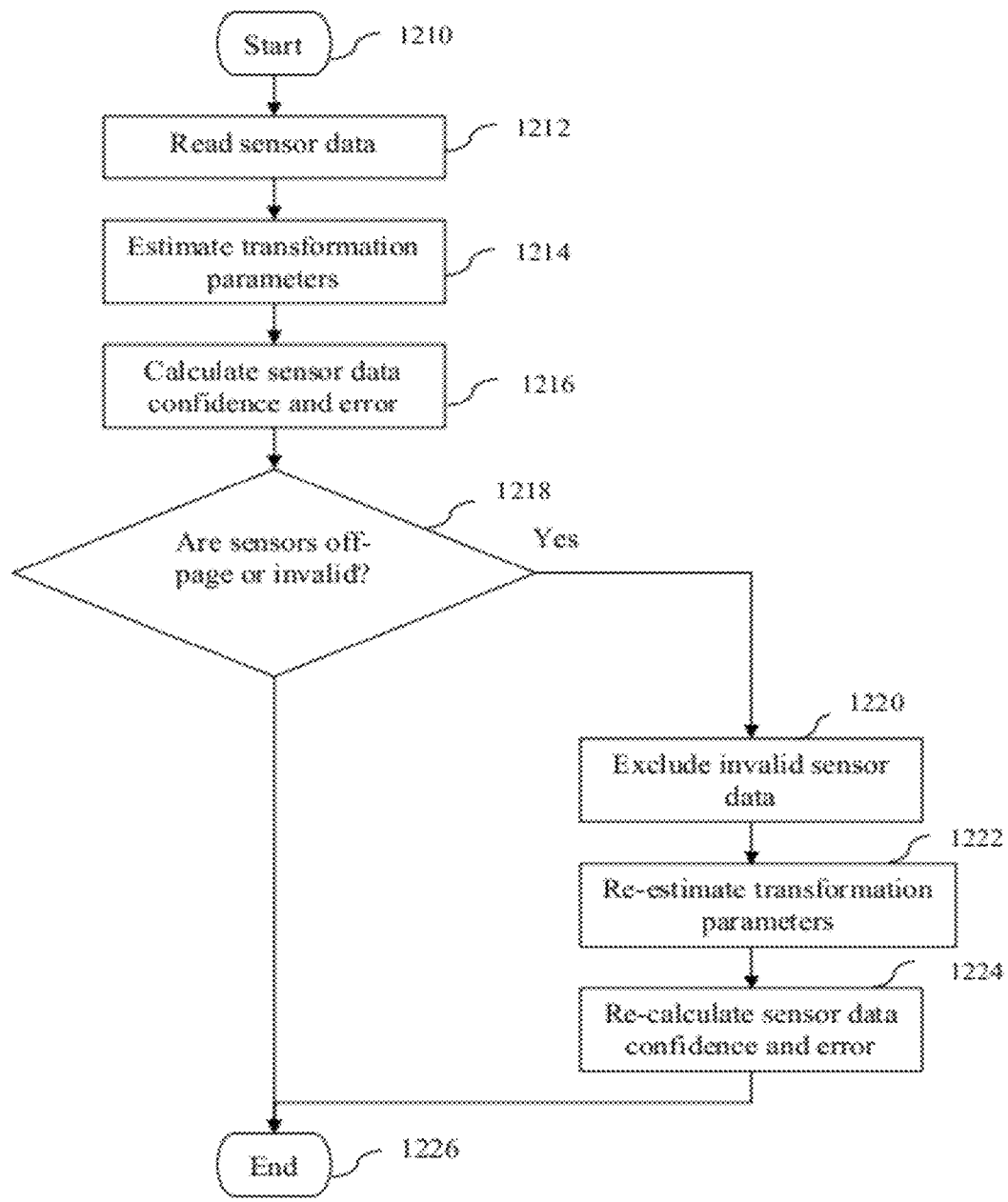
FIG. 6 is a flow diagram illustrating the general process for estimating transformation parameters in the present invention.

The transformation estimation process is shown generally in the flowchart of FIG. 6. The process starts with a scan button being pressed (step 1210). Once the scan button is pressed, the image capturing unit, i.e. camera 14, begins capturing frames, i.e. frame i, frame i+1, frame i+2, etc. at, for example, 10 times per second as mouse scanner 10 is moved across and down the page by an operator. As discussed previously, at the same time the new frame is captured the position of that frame is indicated by position data input from laser motion sensors 22 (step 1212). Given position data of 2 to 4 sensors from two frames, the transformation parameters can be estimated (step 1214). As is known, transformation parameters allow pixel locations in one frame to be transformed or mapped into the image space of another frame, or into a common image space. Once we have the transformation parameters we can stitch or blend the two frames together to form a composite image. One of the issues addressed by the present invention is that the position data, which is the keystone of relating one frame to another, is not always accurate.

We have to estimate, accurately, the position data for each frame. To do this we developed a confidence measurement of the accuracy of the position data that we use for the parameter estimation (step 1216).

For rigid body transformation, the transformation of the point p"(x",y",1) (e.g. a point in frame i+1) to p'(x',y',1) (e.g. a point in frame i) can be expressed as $$\begin{pmatrix} x' \\ y' \\ 1 \end{pmatrix} = \begin{pmatrix} \cos\theta & \sin\theta & tx \\ -\sin\theta & \cos\theta & ty \\ 0 & 0 & 1 \end{pmatrix} \begin{pmatrix} x'' \\ y'' \\ 1 \end{pmatrix}.$$

From the sensor data, we can get the sensor position. Let $(x_i(j), y_i(j))$ be the position of sensor j in frame i. Then sensor coordinates related to the image center can be calculated as $(X_i(j), Y_i(j)) = (x_i(j)+Sx(j), y_i(j)+Sy(j))$, where $(Sx(j), Sy(j))$ are coordinates of sensor j relative to the image center in sensor units.

We can obtain up to 4 pairs of sensor positions related to frame i and frame i+1. One pair is sensor S1 position data for frame i and frame i+1, another pair is sensor S2 position data for frame i and frame i+1, and so on.

The transformation parameter estimation is used later to obtain a registration parameter $(tx_i, ty_i, \theta_i)$ that is utilized in registering a plurality of image frames to form a composite image.

Parameter Estimation

For a jth sensor point $p2_i(j)=(X_i(j), Y_i(j))$ in the frame i to be corresponding to $p1_{i+1}(j)=(X_{i+1}(j), Y_{i+1}(j))$ in the frame i+1, the transformation relationship is described as follows.

$$X_i(j) = X_{i+1}(j)\cos\theta_i + Y_{i+1}(j)\sin\theta_i + tx_i$$

$$Y_i(j) = Y_{i+1}(j)\cos\theta_i - X_{i+1}(j)\sin\theta_i + ty_i$$

However, in the real world environment, the laser sensors 22 are not perfectly accurate in reporting the position of mouse scanner 10. This results in a sensor error that is a difference between the actual sensor location (position data) and the sensor location computed from the transformation relationship. The sensor error $e^i(j)=(e_x^i, e_y^i)$ for the jth sensor point pair $(X_i(j), Y_i(j))$ in frame i and $(X_{i+1}(j), Y_{i+1}(j))$ in frame i+1 are expressed as $$e_x^i(j) = X_{i+1}(j)\cos\theta_i + Y_{i+1}(j)\sin\theta_i + tx_i - X_i(j)$$

$$e_y^i(j) = Y_{i+1}(j)\cos\theta_i - X_{i+1}(j)\sin\theta_i + ty_i - Y_i(j)$$

We can obtain the error measurement e for the jth sensor point pair, where j=1 . . . 4

$$e = \begin{bmatrix} e_x(1) \\ e_y(1) \\ e_x(2) \\ e_y(2) \\ e_x(3) \\ e_y(3) \\ e_x(4) \\ e_y(4) \end{bmatrix}$$

We will have 8 elements in the error measurement vector e. The k-th row of the Jacobian matrix J is:

$$J_k = \begin{bmatrix} \frac{\partial e_k}{\partial tx} & \frac{\partial e_k}{\partial ty} & \frac{\partial e_k}{\partial \theta} \end{bmatrix}.$$

We can use an iterative method to estimate the parameter given an initial parameter $t=(tx_i, ty_i, \theta_i)=(0,0,0)$. Gaussian Newton's method computes a vector of corrections c to be subtracted from the current pair-wise alignments estimation:

$$\hat{t}=t-c \text{ where } c=(J^TJ)^{-1}J^Te.$$

We use weighted least-square minimization by considering the sensor lift situation. If a sensor is lifted, the weight for the error related to the sensor will be set to zero. The weighted least-square equation is WJc=We where W is a diagonal matrix consisting of weights for each error.

For example, if the jth sensor is lifted, the weight for the error related to the sensor is set to 0.

$$W(2*j)=0$$

$$W(2*j+1)=0$$

The determination of whether a sensor is off-page or invalid (reporting incorrect position data) is detailed in the below section entitled "Off Page Detection." This is shown generally as step 1218 in FIG. 6. Generally, each sensor reports a "lift bit" that indicates that a sensor is too far from the page to correctly report position data. However, sometimes the sensor is lifted (off-page) but this condition is not reported. So, in the present invention, we use the registration error and compare it to an empirically determined threshold to decide if at least one of the sensors is actually off-page and/or invalid.

In addition, we use weight to consider the geometric properties of sensor location. If the 4 sensors are not formed in a square, the errors from horizontal and vertical pairs are weighted differently to improve the accuracy. For example, in the embodiment shown in FIG. 1, the 4 sensors S1-S4 are formed in a rectangle so we weight the errors from the horizontal and vertical pairs differently.

WeightFactor=sqrt(Y_X_Ratio);

Where Y_X_Ratio is the ratio of vertical distance and horizontal distance of the rectangle formed by four sensors.

$$W(2*j)=1$$

$$W(2*j+1)=\text{WeightFactor}$$

Once the weight matrix is decided, the weighted least-square minimization can be done by $c=(J^TW^TWJ)^{-1}J^TW^TWe$.

In an embodiment of the present invention, we remove the error elements if the weights are zeros for the lifted sensor (step 1220 in FIG. 6). As a result, the error measurement vector e will have K elements, and the Jacobian matrix J will be K by 3.

K=2*m, where m (m<=4) is the number of valid sensors.

K is the number of equations for the 3 unknowns. As a result, it requires K>=3 so that at least 2 valid sensor readings are needed. Once we have excluded the invalid sensor data, we re-estimate the transformation parameters (step 1222) as outlined above, and re-calculate the sensor data error and re-measure the confidence that the transformation parameters are true (step 1224). Once the transformation parameters have been re-estimated this part of the process ends (step 1226), and the process moves to registration of frames (step 732 in FIG. 3). However, before moving on to registration, we discuss confidence measurement and off-page detection in the following sections.

Confidence Measurement

Having removed the sensor registration error as described above, we now perform a confidence measurement of the transformation parameters. The covariance matrix (sometimes referred to as the variance-covariance matrix), Qxx, is defined $Q_{xx}=(J^tWJ)^{-1}$ The covariance matrix, Qxx, contains the variance of each unknown and the covariance of each pair of unknowns.

For any set of quantities, an error ellipse can be calculated. The dimensions and orientations of the ellipse are calculated from the coefficients of the covariance matrix.

The ellipse matrix is composed of entries from the covariance matrix. For example, a three-dimensional error ellipsoid is computed from $$Q'xx = \begin{bmatrix} q_{aa} & q_{ab} & q_{ac} \\ q_{ba} & q_{ba} & q_{bc} \\ q_{ca} & q_{cb} & q_{cc} \end{bmatrix}$$

where covariance values are from the covariance matrix Qxx, and a, b, and c are the indices for the unknowns for which the ellipse is computed.

If only angle confidence is to be measured, the covariance matrix has only one element Q'xx=Qxx(3,3).

The quantities in Qxx need to be scaled by a reference variance. This reference variance, $S_0^2$, is related to the weighting matrix and the residuals by the equation $$S_0^2 = \frac{e^t W e}{r},$$

where r is the number of degrees of freedom (i.e., the number of equations minus the number of unknowns).

r=K-3=2*m-3 where m (m<=4) is the number of valid sensors.

The error ellipse semi-axes are given by $S_{axis}=\pm\sqrt{S_0^2 \text{eigenvalue}_{axis}(Q'xx)}$.

The orientation of the error ellipse is the column eigenvectors of Q'xx.

To determine the error to a specific confidence level, the length of the semi-axis is multiplied by a confidence factor based on the Fisher distribution using the formula $S_{axis\%}=S_{axis}\sqrt{2\text{Fisher}(1-\text{confidence}\#\text{unknowns},r)}$, where the confidence is a number from 0 to 1, with 1 being complete confidence, and r is the number of degrees of freedom.

The Fisher distribution is determined from the equation $$\alpha = \int_{Fisher(\alpha,v_1,v_2)}^{\infty} \frac{\Gamma((v_1+v_2)/2)}{\Gamma(v_1/2)\Gamma(v_2/2)} \left(\frac{v_1}{v_2}\right)^{v_1/2} \frac{x^{(v_1-2)/2}}{[1+(v_1/v_2)]x^{(v_1+v_2)/2}} dx$$

where the Gamma function is given by $$\Gamma(v) = \int_0^{\infty} u^{v-1} e^{-u} du.$$

The error ellipse can be computed for any confidence level. The Fisher distribution needs to be computed for the selected confidence. We can calculate the error ellipse at 95% confidence level.

The meaning of the 95% confidence error ellipse is that there is 95% probability that the true parameters will remain within the area specified by the ellipse. As expected, as more sensors are used in the computation, the area of the ellipse becomes smaller. If the estimated values lie closer to the true parameter, this will also reduce the ellipse area.

As a result, we may choose a threshold to trust sensor estimation if $S_{axis\%}<T$ T is a parameter to be set experimentally.

The error ellipse at 95% confidence level may be used as a dynamic search area for registration or we can produce a confidence value between 0-1 by a confidence function confidence=$f(S_{axis\%})$.

For example, the confidence function may use $f(x)=e^{-x^2/\sigma^2}$ where σ is a parameter to be set experimentally.

Off Page Detection (step 1218 in FIG. 6)

Laser sensors 22 being off page is a major problem that affects the registration accuracy, especially when the sensors do not correctly report the "lift bit."

As discussed above regarding the confidence measure of the sensor estimation, we can estimate the error ellipse of (Tx, Ty).

The covariance matrix (sometimes referred to as the variance-covariance matrix), Qxx, is defined as $Q_{xx}=(J^tWJ)^{-1}$ In order to calculate the error ellipse of (Tx, Ty), $$Q'xx = \begin{bmatrix} Qxx(1,1) & Qxx(1,2) \\ Qxx(2,1) & Qxx(2,2) \end{bmatrix}$$

The error ellipse semi-axes are given by $S_{axis}=\pm\sqrt{S_0^2 \text{eigenvalue}_{axis}(Q'xx)}$ To detect a sensor "off page" condition, we calculate the semi-axis of the error ellipse as follows:

$Sx_{axis}=\pm\sqrt{S_0^2 * Q'xx(1,1)}$ $Sy_{axis}=\pm\sqrt{S_0^2 * Q'xx(2,2)}$

The registration error is $Se=\sqrt{Sx_{axis}^2+Sy_{axis}^2}=S_0*\sqrt{Q'xx(1,1)+Q'xx(2,2)}$ If the registration error is large, we draw the conclusion that at least one of the sensors is off page. We compare the error to a threshold to make such conclusion. The threshold is determined empirically for a particular device by scanning one or more images under a variety of conditions with one or more sensors off-page and measuring the error for each of those test conditions.

Off Page Sensor Detection and Re-Estimation

We will set a sensor as invalid based on the assumption that the off page sensor will have less motion length because the sensor stops increasing position values when it is off page. The following summarizes the process steps.

Step 1:

We will initially use all no-lift sensors to estimate the transformation, and calculate the Se value from the parameter estimation.

Step 2:

If the Se is greater than T_high (empirically determined threshold, e.g. 5) and there are more than T_low (empirically determined threshold, e.g. 3) sensors that reported no lift, we will calculate the motion vector of the valid sensors.

Step 3:

We choose the sensor that has less than the average motion length to be invalid.

We next describe the registration aspect of the present invention, which is shown generally as step 732 in FIG. 3.

Registration (step 732 in FIG. 3)

In the present invention we provide a method to stitch a pair of images together. The stitching algorithm of the present invention involves minimization of a cost function that consists of registration errors from the image data of the two images, as well as the estimated errors from the set of sensors. The weight function in the cost function derived from the confidence value of sensor estimation which considered the sensor errors including lift and off page as well as a measure of accuracy of the sensor readings. The algorithm of the present invention uses weights to adjust image registration accuracy against sensor accuracy to produce a set of registration parameters that would best stitch the two images together. As a result, in the low content area, the sensor data has more weight than image data while in rich content area the image data will have more weight than sensor data. Therefore, the pair-wise image registration can achieve higher accuracy by fusing information from both sensor data and image data. In order to handle large errors for initial registration parameters and to avoid local minima in the minimization process, the image pair may be registered in lower resolution and then refined in high resolution. A detailed explanation is provided as follows.

Pair-wise image registration based on corner matches may fail or be inaccurate if there are no or few salient corners inside the overlapping area of the pair of images. As a result, we may need to refine the registration from initial registration using a feature-based method or using the sensor data. In the present invention, we perform registration by integrating image data and sensor data.

Pair-Wise Image Registration Based on Rigid Body Transform Model

Figure 7:
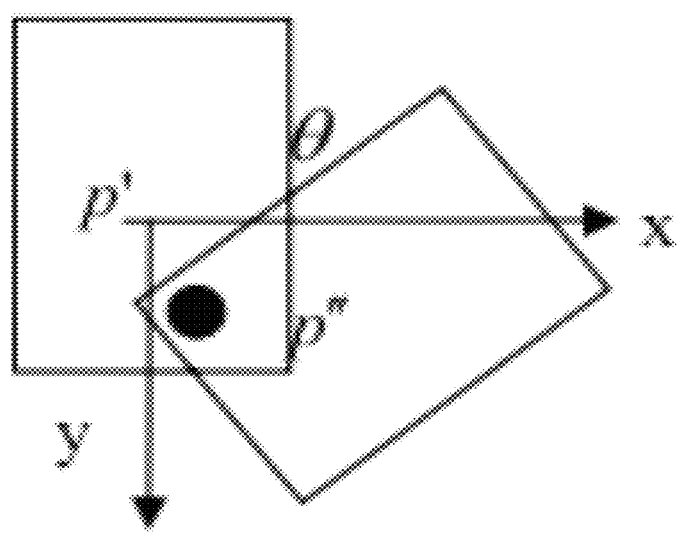
FIG. 7 illustrates the relationship of two frames, frame i and frame i+1, disposed to one another at an angle θ in a common x-y coordinate space.

FIG. 7 illustrates the relationship of two frames, frame i and frame i+1, with pixel point p' in frame i and a corresponding pixel point p" in frame i+1. The two frames are disposed to one another at an angle θ in a common x-y coordinate space, and have an overlap area identified with a black dot therein. The transformation matrix for aligning frame i to frame i+1

$$M_i = \begin{pmatrix} \cos\theta_i & \sin\theta_i & tx_i \\ -\sin\theta_i & \cos\theta_i & ty_i \\ 0 & 0 & 1 \end{pmatrix}$$

The transformation relationship of the point $p_i(j)=(X_i(j),Y_i(j))$ to the point $p_{i+1}(j)=(X_{i+1}(j),Y_{i+1}(j))$ can be expressed as follows:

$$X_i(j)=X_{i+1}(j)\cos\theta_i+Y_{i+1}(j)\sin\theta_i+tx_i, Y_i(j)=Y_{i+1}(j)\cos\theta_i-X_{i+1}(j)\sin\theta_i+ty_i.$$

Registration Using Sensor Data

Registration parameter estimation from sensor data is described in the foregoing discussion of "Transform Estimation."

We extracted the matched pairs of valid sensor coordinates which are stored in arrays named pt1 and pt2, for example, in RAM 204.

The sensor error $e(j)=(e_x,e_y)$ for the jth sensor point pair (pt1[j].fX,pt1[j].fY) in a template (second) frame and (pt2[j].fX,pt2[j].fY) in a reference (first) frame are expressed as $$e_x(j)=pt1(j).fX^*\cos\theta-pt1(j).fY^*\sin\theta+tx-pt2(j).fX$$

$$e_y(j)=pt1(j).fX^*\sin\theta+pt1(j).fY^*\cos\theta+ty-pt2(j).fY$$

We obtain the error measurement e for j=1 . . . 4

$$e = \begin{bmatrix} e_x(1) \\ e_y(1) \\ e_x(2) \\ e_y(2) \\ e_x(3) \\ e_y(3) \\ e_x(4) \\ e_y(4) \end{bmatrix}$$

We will have 8 elements in the error measurement vector e. The k-th row of the Jacobian matrix J is $$J_k = \begin{bmatrix} \frac{\partial e_k}{\partial tx} & \frac{\partial e_k}{\partial ty} & \frac{\partial e_k}{\partial \theta} \end{bmatrix}$$

The cost function of registration parameter estimation is given as $$ES = \sum_{j=1}^{4} (e_x(j)^2 + e_y(j)^2) = \sum_{k=1}^{8} e(k)^2$$

From the sensor data, we obtain the estimated parameters based on an iterative method minimizing the errors (tx, ty, theta) and confidence measurement based on the semi-axis of error ellipse for translation (S_Tran).

Registration Using Image Data

Figure 8:
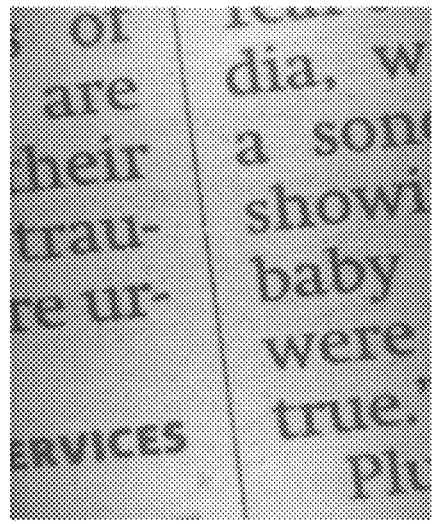
FIG. 8 illustrates two frames that were scanned with mouse scanner 10 with their positions recorded by laser sensors 22.
Figure 8:
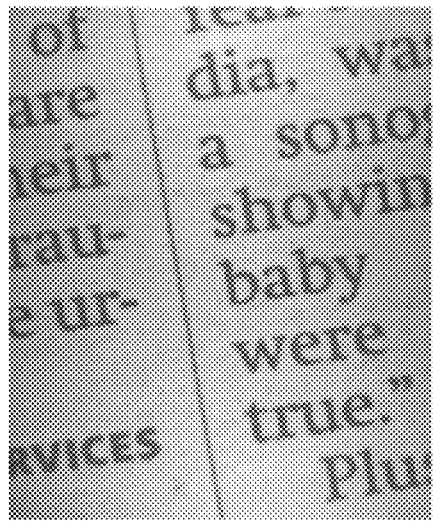

Registration using image data is formulated as a minimization problem. In order to register the two frames, the overlapping area can be extracted based on registration parameter estimated from sensor data. FIG. 8 illustrates two frames, Frames 16 and 17, which were scanned with mouse scanner 10 with their positions recorded by laser sensors 22.

Based on the sensor data, the initial estimation of the registration parameter, as described in the forgoing sections, is obtained as:

$$Tx=18.2946, Ty=-2.0619 \text{ and Theta}=-0.0320$$

The semi-axis of the error ellipse for translation is 0.7281, which is at 95% confidence level.

Figure 9:
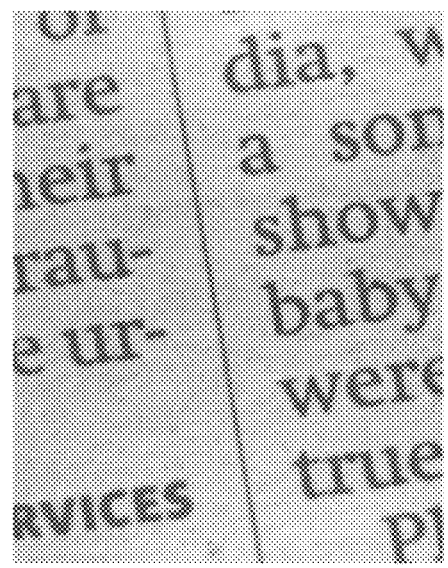
FIG. 9 illustrates the overlap area between the two frames shown in FIG. 8.

The overlapping area is extracted from the second frame, Frame 17, which is used as a template:

tmplt=SecondImg(y1:y2,x1:x2). FIG. 9 illustrates the overlap area.

The 4 points of the rectangle of the tmplt are:

[x1, y1], [x2, y1], [x1, y2], [x2, y2].

The registration based on the image data involves matching pixels in the template image (second frame) to those pixels in the reference image (first frame).

Let T be an (n by m) image template, which can be considered as a matrix. Let x=(u,v) be the (2×1) vector containing the coordinates of a pixel: $(u,v)\in\{1, 2 \ldots n\}\times\{1, 2 \ldots m\}$. Thus T(x) is the intensity of the pixel x.

Let p be the registration parameter vector, $p=(tx,ty,\theta)$, the transformation matrix of p is M(p) as $$M(p) = M(tx, ty, \theta) = \begin{pmatrix} \cos\theta & \sin\theta & tx \\ -\sin\theta & \cos\theta & ty \\ 0 & 0 & 1 \end{pmatrix}$$

If $p=0=(0,0,0)$, the M(0) is the identity matrix $$M(0) = M(0, 0, 0) = \begin{pmatrix} 1 & 0 & 0 \\ 0 & 1 & 0 \\ 0 & 0 & 1 \end{pmatrix}$$

The map w which maps the pixel x in the template image to the corresponding pixel in the reference image according to parameter p is defined as w(x; p)

$$W(x; p) = W\left(\begin{bmatrix} u \\ v \end{bmatrix}, \begin{bmatrix} tx \\ ty \\ \theta \end{bmatrix}\right) = \begin{pmatrix} W_u(p) \\ W_v(p) \end{pmatrix} = \begin{pmatrix} \cos\theta*u + \sin\theta*v + tx \\ -\sin\theta*u + \cos\theta v + ty \end{pmatrix}$$

Let $q=nm$ be the total number of the pixels in the template image T.

We need to map q pixels into the reference image. For each pixel, $x(k)=(u(k),v(k))$, the mapping point in the reference image is W (x(k); p), $k=1 \ldots q$.

Let I be the reference image, where I(W(x;p)) is the intensity of mapped point W(x;p) corresponding to pixel x in the template image according to current registration parameter p.

Assuming the illumination is constant, the intensity of pixel x in template image T(x) will be matched or the same as the intensity I(W(x;p)) of mapped pixel in the reference image if the registration parameter p is correct. The registration refinement can be described by the minimization problem:

$$EI = \min_p \|I(W(x; p)) - T(x)\|_2 =$$

$$\min_p (I(W(x; p)) - T(x))^2 = \min_p \sum_{k=1}^{q} (I(W(x(k); p) - T(x(k)))^2$$

where $k=1 \ldots q$, and $q=nm$ is the total number of pixels in the template image.

In order to solve the minimization problem, a Gauss-Newton, a Newton, a steepest-descent, or ESM method may be used.

A preferred embodiment is based on Lucas-Kanade Algorithm (which is a Gauss-Newton gradient descent non-linear optimization algorithm).

We make the assumption that our initial parameters from the sensor data or a few matched corner pairs are near to the optimal solution so that gradient least-square optimization is used in the area-based registration procedure.

For the pixel x(k) in the template image, the error measurement $e_k=I(W(x(k),p))-T(x(k))$ is the intensity difference, $k=1 \ldots q$, where q is the total number of pixels in the template.

The k-th row of the Jacobian matrix J corresponding to $e_k$ is $$J_k = \begin{bmatrix} \frac{\partial e_k}{\partial p_1} & \frac{\partial e_k}{\partial p_2} & \frac{\partial e_k}{\partial p_3} \end{bmatrix} = \begin{bmatrix} \frac{\partial e_k}{\partial tx} & \frac{\partial e_k}{\partial ty} & \frac{\partial e_k}{\partial \theta} \end{bmatrix}.$$

The error measurement e is a (q by 1) vector and J is a (q by 3) matrix, where q is the total number of pixels in the template image.

The correction vector c is calculated as:

$$\Delta p = -(J^T J)^{-1} J^T e.$$

For each iteration the p is update by $\Delta p$ $$p \leftarrow p + \Delta p$$

until $\Delta p < \epsilon$ is very small or we have reached the maximum iteration.

Registration Integrating Image and Sensor Data

In order to integrate the sensor and image data, the registration is formulated as a minimization of a cost function:

$$E = EI + \lambda ES = \sum_{k=1}^{q} (I(W(x(k); p) - T(x(k)))^2 + \lambda \sum_{j=1}^{l} (e_x(j)^2 + e_y(j)^2).$$

In order to distinguish the error from image data and error from sensor data, let $ei(k)=I(W(x(k);p)-T(x(k))$, where $k=1 \ldots q$, q is total number of pixel in template image, $es(2j-1)=e_x(j)$, $es(2j)=e_y(j)$. And $j=1 \ldots l$, where l is number of valid sensors.

If we produce a new error measurement vector $$e = \begin{bmatrix} ei \\ \lambda * es \end{bmatrix}$$

The new error vector has $K=q+2*l$ elements. Thus the cost $$E = EI + \lambda ES =$$

$$\sum_{k=1}^{q} (I(W(x(k); p) - T(x(k)))^2 + \lambda \sum_{j=1}^{l} (e_x(j)^2 + e_y(j)^2) = \sum_{k=1}^{K} e(k)^2.$$

function is

The new Jacobian matrix can be obtained by $$J = \begin{bmatrix} JI \\ \lambda * JS \end{bmatrix}.$$

The new Jacobian matrix is a K by 3 matrix.
Using pseudo-inverse of Jacobian matrix, we can obtain $$\Delta p = -(J^T J)^{-1} J^T e.$$

For each iteration the p is update by $\Delta p$ $$p \leftarrow p + \Delta p$$

until $\Delta p < \epsilon$ is very small or we have reached the maximum iteration.

Weight Function Integrating Image and Sensor Data

In order to fuse the two error functions from EI and Es, we need find a proper weight function. According to our investigation, we may choose a simple weight function for the pair-wise registration:

λ=WeightCon/S_Tran so that the cost function will be E=EI+WeightCon/S_Tran*Es and WeightCon is a constant=200, which we determined experimentally.

S_Tran is the semi-axis of error ellipse described above in Transform Estimation (step 730).

If the sensor data is reliable, the weight should be large, so that the λEs will have a large penalty when the current registration parameter is going away from initial estimated position from sensor data. As a result, the cost function E=EI+λEs will be dominated by λEs so that its minimum is close to the minimum of Es.

If the sensor data is unreliable, the weight should be small, so that λEs will be flat, so that the penalty will be very small when current registration parameter is going away from initial estimation position from sensor data. As a result, the cost function E=EI+λEs will be dominated by EI so that its minimum is close to the minimum of EI.

By adjusting the weight, we will be able to adjust how to balance EI and Es. If sensor data is reliable, we trust the sensor data more. If sensor data is not reliable, we will trust the intensity based registration from the image data more.

Since we use S_Tran to evaluate the sensor confidence, the S_Tran is the semi-axis of error ellipse. The larger S_Tran means less reliable sensor data.

If the sensor data is reliable, the semi-axis of error ellipse, S_Tran, is close to 0. The weight will be very large. As a result, we trust the sensor data much more.

If the sensor data is not reliable, the semi-axis of error ellipse, S_Tran, is very large. The weight will be very small. As a result, we rely much less on sensor data.

In addition, we treat all sensor pairs equally when we estimate the S_Tran from only two sensors. According to our prior knowledge, the errors estimated from the longer pair of two sensors are much less than the errors estimated from the shorter pair of two sensors. As a result, the calculation of S_Tran may need to be modified according to suit a particular sensor geometry.

Refine Registration from Low Resolution to High Resolution

An assumption in the above procedure is that the initial parameters from the sensors are close to the optimal or true values.

If the sensor data is not reliable, the initial estimation of registration parameters will be far from the true values. As a result, it may not converge or converge into a local minimum.

Based on the semi-axis of error ellipse, we know with a 95% confidence level what the true value should be.

If the sensor is reliable, the S_Tran is small, typically less than 1 pixel, so that there is no need for registration at a lower resolution. The method of the present invention has been shown to register the images even if the initial guess is 5 to 8 pixels too far from the true value.

If the sensor is unreliable, the S_Tran is typically 3 to 10 pixels, so that we may use our method to register in low resolution of ½.

If there a very large error, the S_Tran may be over 20 pixels, so that we may use our method to register in even lower resolution of ¼.

Figure 10:
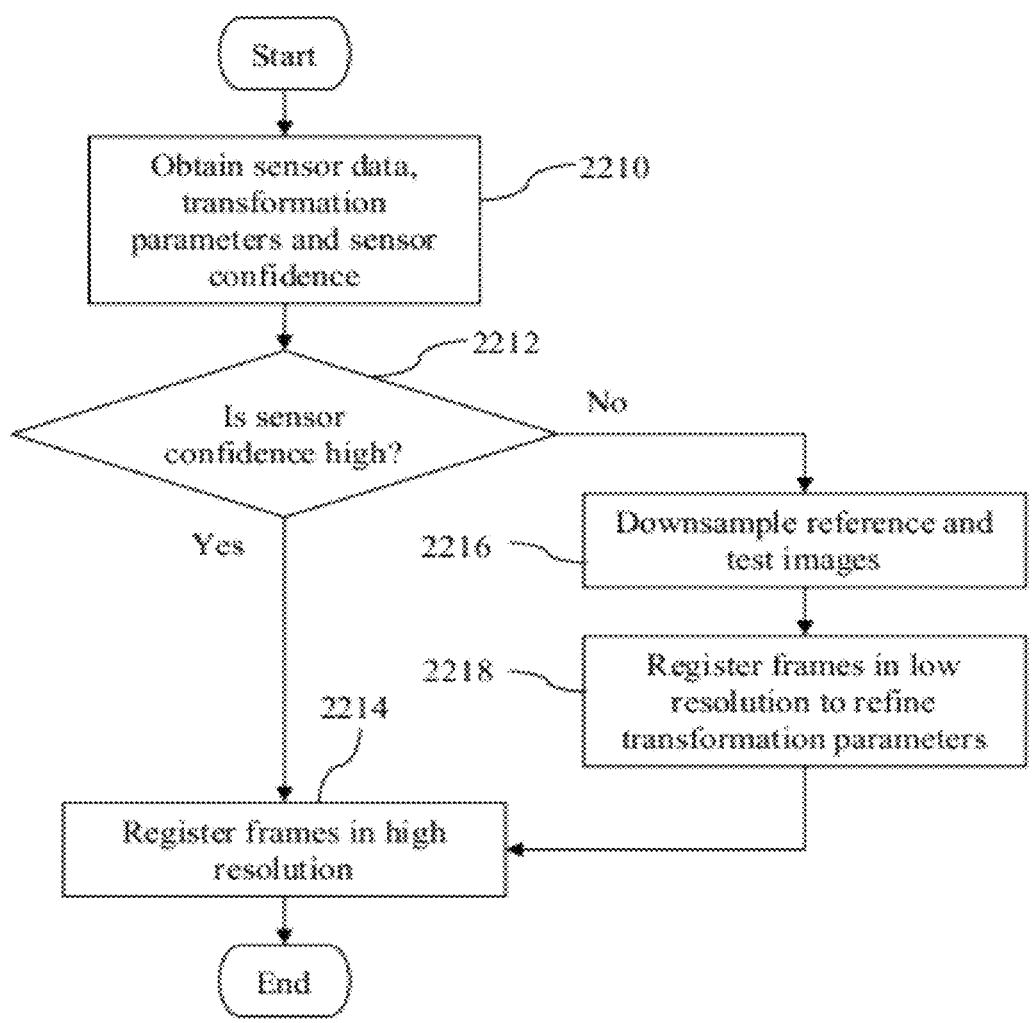
FIG. 10 is a flowchart generally showing registration of two images where downsampled images are registered in a low resolution when sensor confidence is low.

FIG. 10 illustrates the general flow. In step 2210, the sensor data, the estimated transformation parameters and sensor confidence are obtained as outlined above in the section entitled "Transform estimation (step 730)." If the sensor confidence is high, i.e. S_Tran is small, typically less than a few pixels (step 2212 returns Yes), we register the frames in high resolution (step 2214) as outlined above. If the sensor confidence is low, i.e. S_Tran is high, typically more than a few pixels (step 2212 returns No), we downsample the reference and test images (i.e. second and first frames) to achieve a lower resolution (step 2218) and register the frames first in low resolution as outlined above. The low resolution we choose, ¼ or ½, depends on the degree of the error. After this initial registration, we then refine the registration of the frames again by repeating the registration steps outlined above using the higher resolution image frames.

Loop Correction (step 738 in FIG. 3)

The following is a discussion of the loop correction aspect of the present invention. Pair-wise image stitching based on pair-wise alignment may result in accumulated errors if each frame overlaps only with the previous frame. When scanning an image, mouse scanner 10 is moved across a document from left to right, and then down, and then right to left, for example. Each frame will usually overlap with a frame to its right and/or left and a frame above and/or below it. If we go back to a prior captured frame (captured before the immediately previous frame) a "close-the-loop condition" is detected if we can align the current frame with this prior captured frame, which may be part of the image above or below the current frame, for example. We generally assume all pair-wise registrations are successful. However, if a break happened, the pair-wise registration will not be available. The new frame after break will be allocated in a new place according to the transform matrix from sensor data until a closed loop is identified. The close-the-loop correction will assign all errors to the frame where the break happened. Assuming the break happened between frames i and i+1 (FIG. 11). Then a prior (prior to frame i) captured frame n must be registered with frame i+1 to form a closed loop (FIG. 12). Ti is a transformation matrix between frames i and i+1:

$$T_i=(T_1T_2\ldots T_{i+1})^{-1}(T_{i+1}\ldots T_n)^{-1}$$

Once Ti is calculated, the closed loop will be fixed.

If a pair-wise registration has been corrected by a closed loop, the pair-wise registration will be set "fixed" as shown in FIG. 12. We will not change the pair-wise registration any further once it is "fixed".

There are a few cases that we pay attention to for new loop identification. For example, a closed loop contains a closed loop for a spiral scanning, or a new closed loop inside a closed loop. We list two possible cases.

Case 1, the new loop contains one or more closed loops (FIG. 13).

As shown in FIG. 13, a new loop contains a closed loop, which has been corrected. Frames from 1 to N are extracted for the new loop (the outer loop), but frames K to L (the inner loop) are already corrected.

The new loop is extracted from frame 1 to N. We may refer the extracted frames from 1 to n as shown as the lower row in FIG. 14.

We will obtain an index vector, which contains only the non-fixed frame numbers. For the above example, we will have index vector of size (N−(L−K)), which contains the frame number [1, . . . K,L+1 . . . N]

Case 2, the new loop is inside a closed loop (FIG. 15).

The new loop is extracted from frame K to N (FIG. 16). We may refer the extracted frames from 1 to n as shown as the lower row in FIG. 17.

We will obtain an index vector, which contains only the non-fixed frame numbers. For the above example, we will have index vector of size (N−L) or (n−k), which contains the frame number [L+1 . . . N] or [k+1 . . . n].

The global optimization will then process the extracted loop, but it is only to correct the non-fixed pair-wise registration recorded in the index vector.

The following are discussions of modification of the algorithm for certain situations.

Single Loop Correction with Break Frame

The following is a discussion of the correction for the closed loop with a break between frames i and i+1.

According to the global constraint of the closed loop $T_1 T_2 \ldots T_i \ldots T_n = I$, where I is the identity matrix $$\begin{pmatrix} 1 & 0 & 0 \\ 0 & 1 & 0 \\ 0 & 0 & 1 \end{pmatrix}.$$

Combining the N pair-wise transformation matrices Ti will bring us back to the same frame where we started, i.e. frame 1 (i=1), thus registering the last frame of the loop with the first frame and thereby closing the loop.

We assign all errors to the pair-wise registration between frames i and i+1, and as a result, $T_i = (T_1 T_2 \ldots T_{i+1})^{-1} (T_{i+1} \ldots T_n)^{-1}$ $$T_i = \begin{bmatrix} \cos\theta_i & \sin\theta_i & tx_i \\ -\sin\theta_i & \cos\theta_i & ty_i \\ 0 & 0 & 1 \end{bmatrix}.$$

We will update the pair-wise registration parameters $tx_i$, $ty_i$, and $\theta_i$ according to the transformation matrix. Once the pair-wise registration of frame i to i+1 is updated, the display of image frame from i+1 to frame n will be updated, and all pair-wise registrations from 1 to n are set to 'fixed'.

Figure 17:
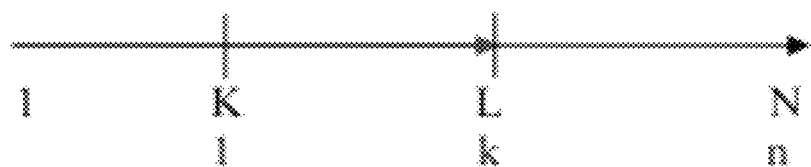
FIG. 17 illustrates extraction of the new loop shown in FIG. 16 from frames 1 to N.

Correction of Closed Loop with Fixed Frames index=[1 ... k,l+1, ... n] vector is size of n' (n'=n−l+k) (FIG. 14).

index=[k+1, ... n] vector is size of n' (n'=n−k) (FIG. 17).

We will have global constraints for the closed loop.

$$T_1 T_2 \ldots T_i \ldots T_n = I$$

We get three independent scalar constraints to minimize.

$$e_1 = \sin(\theta_1 + \ldots + \theta_n)$$

$$e_2 = tx_1 + tx_2 \cos\theta_1 + ty_2 \sin\theta_1 + tx_3 \cos(\theta_1+\theta_2) + ty_3 \sin(\theta_1+\theta_2) + \ldots + tx_n \cos(\theta_1+\ldots+\theta_{n-1}) + ty_n \sin(\theta_1+\ldots+\theta_{n-1})$$

$$e_3 = ty_1 - tx_2 \sin\theta_1 + ty_2 \cos\theta_1 - tx_3 \sin(\theta_1+\theta_2) + ty_3 \cos(\theta_1+\theta_2) + \ldots - tx_n \sin(\theta_1+\ldots+\theta_{n-1}) + ty_n \cos(\theta_1+\ldots+\theta_{n-1})$$

From frame k+1 to 1, they are fixed so that the pair-wise registration parameters $(tx_i, ty_i, \theta_i)$ i=k+1 ... l will be treated as constants.

We will not include error measurements for the fixed pair-wise registration. As a result, we will obtain the error measurements for non-fixed pair-wise registration and 3 global constraints. The e error measurement will have K elements.

$$K = 3 + 2 \sum_{i=1}^{n'} m_i$$

where the $m_i$ is the number of matched feature points between frame index(i) and index(i)+1, n' is the total number of non-fixed pair-wise registrations.

Since we will not correct the fixed pairs, the Jacobian matrix, J, will be K by 3*n'.

The kth row of the Jacobian matrix J is $$J_k = \begin{bmatrix} \frac{\partial e_k}{\partial tx_{index(1)}} & \frac{\partial e_k}{\partial ty_{index(1)}} & \frac{\partial e_k}{\partial \theta_{index(1)}} & \cdots & \frac{\partial e_k}{\partial tx_{index(n)}} & \frac{\partial e_k}{\partial ty_{index(n)}} & \frac{\partial e_k}{\partial \theta_{index(n)}} \end{bmatrix}$$

The correction vector c for non-fixed pair-wise registration will be 3*n' by 1.

The correction vector c is calculated as $$c = (J^T J)^{-1} J^T e$$

Once we obtained the correction vector, we can update the non-fixed pair-wise registration estimation:

$$t_2 = t_2 - c$$

where $t_2 = (tx_{index(1)}, ty_{index(1)}, \theta_{index(1)} \ldots tx_{index(n)}, ty_{index(n)}, \theta_{index(n)})$ is the current non-fixed pair-wise registration estimation (step 740 in FIG. 3).

By performing loop correction according to the present invention and then updating the frame coordinates, the scanned image is re-tensioned, i.e. the individual scanned frames are tightened together to approximate the original image. The scanned image can then be rendered (step 742 in FIG. 3) and the image can be displayed, projected, or printed, for example (step 744 in FIG. 3). Alternatively, or additionally, the scanned image can be subjected to known blending algorithms (step 746 in FIG. 3) that reduce noticeable overlap regions between adjacent frames. After blending, the image can be displayed, projected, or printed, for example (step 748 in FIG. 3), and the process ends (step 750 in FIG. 3).

Global Optimization for Close-the-Loop Error Minimization

As we discussed above, pair-wise image stitching based on pair-wise alignment will result in accumulated errors if each frame overlaps only with the previous frame. If we go back to an earlier frame, a close-the-loop is detected. Due to the accumulated errors, however, the loop may not close.

In the present invention, we employ a global minimization strategy to do backward correction to all the frame alignments. Close-the-loop can be detected by checking if there are significant overlaps between the current frame and earlier frames. The following describes the global optimization for close-the-loop error minimization using backwards correction.

Figure 18:
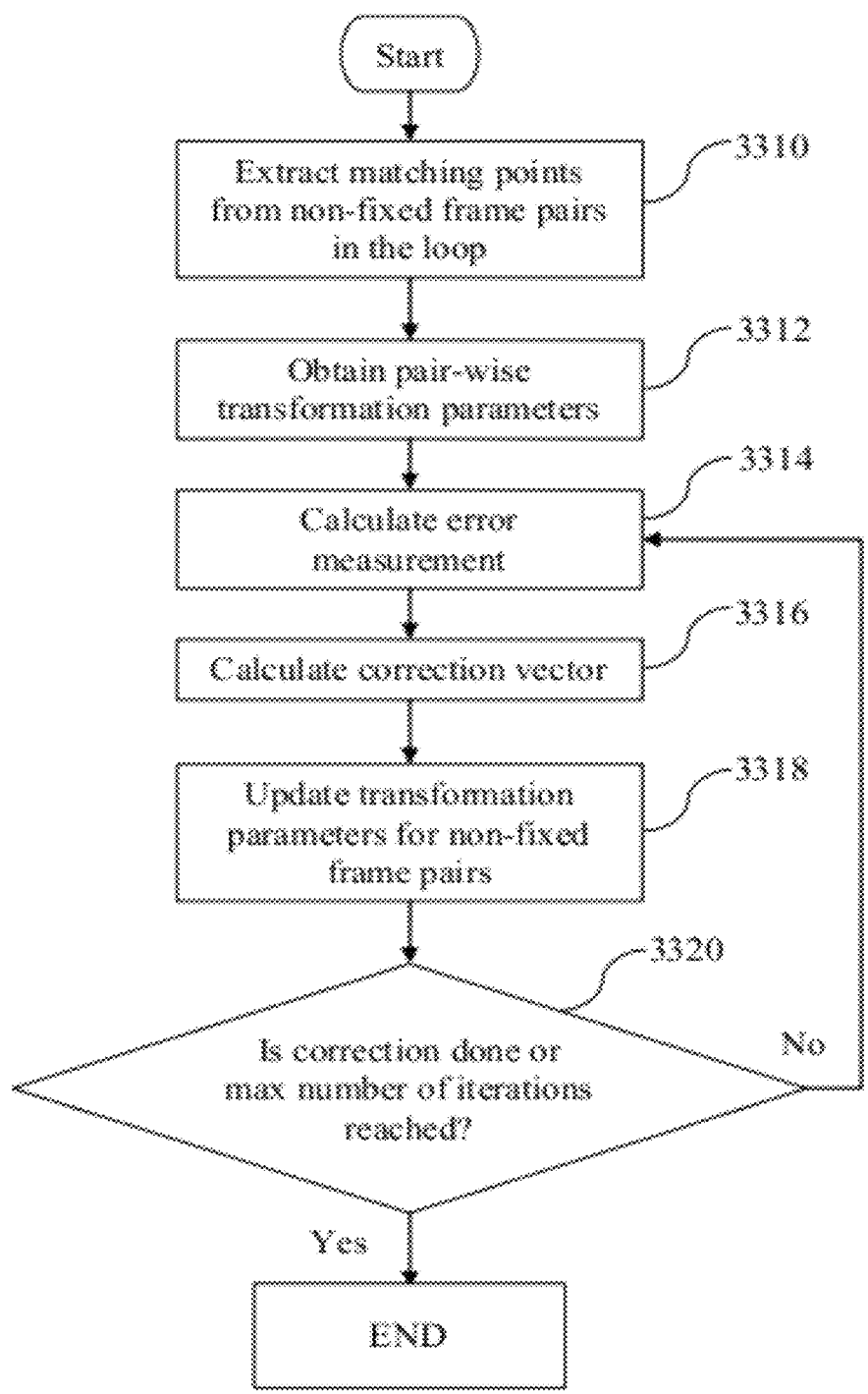
FIG. 18 is a flowchart generally outlining the steps of loop correction.

The following is an exemplary implementation of loop correction by global optimization, with reference to FIG. 18.

(1) Identify a closed loop. If a closed loop is identified, estimate the pair-wise registration estimation $(tx_n, ty_n, \theta_n)$ from frame n to frame 1.

(2) Extract all (or selected) matched feature point pairs for pair-wise registration (step 3310 in FIG. 18). For example, the jth matched feature point pair $(X_i(j), Y_i(j))$ in frame i and $(X_{i+1}(j), Y_{i+1}(j))$ in frame i+1, j=1 ... $m_i$, where $m_i$ is the number of matched feature points between frame i and i+1. The number of all the matched feature point pairs is $$\sum_{i=1}^{n} m_i.$$

(3) Get the current pair-wise registration estimation vector $t=(tx_1,ty_1,\theta_1 \ldots tx_n,ty_n,\theta_n)$. (step 3312)

(4) Calculate error measurement e, which include 3 global constraints and $$2\sum_{i=1}^{n} m_i$$

matched feature point errors. (step 3314)

(5) Calculate Jacobian matrix when preparing the error measurement. J is a matrix of K by 3n, $$K = 3 + 2\sum_{i=1}^{n} m_i$$

(6) Calculate the correction vector. Correction vector c is calculated as $c=(J^T J)^{-1} J^T e$. (step 3316)

(7) Update pair wise registration estimation $\hat{t}=t-c$ (step 3318)

(8) If necessary (step 3320 returns No), repeat (4) to (7) by using the corrected registration $t=\hat{t}$ for next iteration until it converges or reached the maximum iterations (step 3320 returns Yes).

Weighted Least-Square Minimization

In an embodiment, we may use weighted least-square minimization. The weighted least-square equation is WJc=We where W is a diagonal matrix consisting of a weight for each errors.

$$c(J^T W^T W J)^{-1} J^T W^T W e$$

We may introduce weight for each errors based on the uncertainties such as:

(a) estimation uncertainty for pair-wise registration—we may weight the confidence measure based on such factors as resolution, or the number of feature points;

(b) feature point extraction errors—we may weight the strength of the errors; and/or (c) distortion due to lift, tilting or camera calibration—we may weight laser data reliability.

The factors or error sources selected and the weight attributed to such will depend on each particular system and it will require empirical testing to understand the error sources and their impact on global optimization.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for registering a plurality of image frames captured by a scanning device, the scanning device comprising an image capturing unit and a plurality of position sensors that supply position data indicating the relative position of the image capturing device when the image capturing device captures one of the plurality of image frames, comprising:
    reading position data from each of the plurality of position sensors when a first image frame i is captured and when a second image frame i+1 is captured;
    estimating transformation parameters that relate an image center of image frame i+1 to image frame i; and
    calculating a registration error for a plurality of position sensor pairs, a position sensor pair comprising a position indicated by a sensor in image frame i+1 and image frame i.

2. A method as in claim 1 further comprising determining which sensors are off-page or supplying invalid position data.

3. A method as in claim 2 further comprising re-estimating the transformation parameters by excluding position data supplied by sensors that are determined to be off-page or supplying invalid position data.

4. A method as in claim 2 wherein determining which sensors are off-page or supplying invalid position data comprises comparing the registration error to a threshold and determining a sensor is off-page or supplying invalid position data if the registration error exceeds a threshold and a sensor has less than average motion.

5. A method as in claim 1 wherein calculating a registration error for a plurality of position sensor point pairs comprises using weighted least-square minimization.

6. A method as in claim 1 wherein calculating a registration error for a plurality of position sensor point pairs comprises using the geometrical relationship of the position sensors to weight a sensor error, an error from a horizontal pair of sensors being weighted differently than an error from a vertical pair of sensors.

7. A method as in claim 1 wherein estimating the transformation parameters comprises calculating a confidence measurement.

8. A method as in claim 7 wherein calculating a confidence measurement comprises calculating an error ellipse at a 95% confidence level.

9. A scanning device comprising:
    an image capturing unit;
    a plurality of position sensors that supply position data indicating the relative position of the image capturing device when the image capturing device captures one of a plurality of image frames; and
    a processor that:
        reads position data from each of the plurality of position sensors when a first image frame i is captured and when a second image frame i+1 is captured;
        estimates transformation parameters that relate an image center of image frame i+1 to image frame i; and
        calculates a registration error for a plurality of position sensor pairs, a position sensor pair comprising a position indicated by a sensor in image frame i+1 and image frame i.

10. A scanning device as in claim 9 wherein the processor further determines which sensors are off-page or supplying invalid position data.

11. A scanning device as in claim 10 wherein the processor further re-estimates the transformation parameters by excluding position data supplied by sensors that are determined to be off-page or supplying invalid position data.

12. A scanning device as in claim 10 wherein determining which sensors are off-page or supplying invalid position data by the processor comprises comparing the registration error to a threshold and determining a sensor is off-page or supplying invalid position data if the registration error exceeds a threshold and a sensor has less than average motion.

13. A scanning device as in claim 9 wherein calculating a registration error for a plurality of position sensor point pairs by the processor comprises using weighted least-square minimization.

14. A scanning device as in claim 9 wherein calculating a registration error for a plurality of position sensor point pairs by the processor comprises using the geometrical relationship of the position sensors to weight a sensor error, an error from a horizontal pair of sensors being weighted differently than an error from a vertical pair of sensors.

15. A scanning device as in claim 9 wherein estimating the transformation parameters by the processor comprises calculating a confidence measurement.

16. A scanning device as in claim 15 wherein calculating a confidence measurement by the processor comprises calculating an error ellipse at a 95% confidence level.

17. One or more tangible, non-transitory computer-readable media having computer-readable instructions thereon, which, when executed by a processor, register a plurality of image frames captured by a scanning device, the scanning device comprising an image capturing unit and a plurality of position sensors that supply position data indicating the relative position of the image capturing device when the image capturing device captures one of the plurality of image frames, wherein the processor:
  reads position data from each of the plurality of position sensors when a first image frame i is captured and when a second image frame i+1 is captured;
  estimates transformation parameters that relate an image center of image frame i+1 to image frame i; and
  calculates a registration error for a plurality of position sensor pairs, a position sensor pair comprising a position indicated by a sensor in image frame i+1 and image frame i.

18. One or more tangible, non-transitory computer-readable media as in claim 17 further comprising determining which sensors are off-page or supplying invalid position data.

19. One or more tangible, non-transitory computer-readable media as in claim 18 further comprising re-estimating the transformation parameters by excluding position data supplied by sensors that are determined to be off-page or supplying invalid position data.

20. One or more tangible, non-transitory computer-readable media as in claim 18 wherein determining which sensors are off-page or supplying invalid position data by the processor comprises comparing the registration error to a threshold and determining a sensor is off-page or supplying invalid position data if the registration error exceeds a threshold and a sensor has less than average motion.

21. One or more tangible, non-transitory computer-readable media as in claim 17 wherein calculating a registration error for a plurality of position sensor point pairs by the processor comprises using weighted least-square minimization.

22. One or more tangible, non-transitory computer-readable media as in claim 17 wherein calculating a registration error for a plurality of position sensor point pairs by the processor comprises using the geometrical relationship of the position sensors to weight a sensor error, an error from a horizontal pair of sensors being weighted differently than an error from a vertical pair of sensors.

23. One or more tangible, non-transitory computer-readable media as in claim 17 wherein estimating the transformation parameters by the processor comprises calculating a confidence measurement.

24. One or more tangible, non-transitory computer-readable media as in claim 23 wherein calculating a confidence measurement by the processor comprises calculating an error ellipse at a 95% confidence level.

* * * * *